United States Patent
Bachtiger et al.

(10) Patent No.: US 12,057,123 B1
(45) Date of Patent: Aug. 6, 2024

(54) COMMUNICATION DEVICES WITH EMBEDDED AUDIO CONTENT TRANSCRIPTION AND ANALYSIS FUNCTIONS

(71) Applicant: VoiceBase, Inc., San Francisco, CA (US)

(72) Inventors: Walter Bachtiger, Novato, CA (US); Bruce Ramsay, Campbell, CA (US)

( * ) Notice: Subject to any disclaimer, the term of this patent is extended or adjusted under 35 U.S.C. 154(b) by 296 days.

(21) Appl. No.: 17/528,511

(22) Filed: Nov. 17, 2021

Related U.S. Application Data (60) Provisional application No. 63/115,799, filed on Nov. 19, 2020.

(51) Int. Cl.
*G10L 15/00* (2013.01)
*G10L 13/02* (2013.01)
*G10L 15/22* (2006.01)
*G10L 15/26* (2006.01)
*G06Q 20/20* (2012.01)

(52) U.S. Cl.
CPC .............. *G10L 15/26* (2013.01); *G10L 13/02* (2013.01); *G10L 15/22* (2013.01); *G06Q 20/20* (2013.01); *G10L 2015/225* (2013.01)

(58) Field of Classification Search
CPC ......... G10L 15/26; G10L 15/24; H04M 11/10
See application file for complete search history.

(56) References Cited

U.S. PATENT DOCUMENTS

| | | | |
|---|---|---|---|
| 8,811,592 B1* | 8/2014 | Pettay | G10L 15/26 379/265.06 |
| 2002/0114429 A1* | 8/2002 | Engelke | H04M 1/64 379/88.01 |
| 2010/0287458 A1* | 11/2010 | Guller | G06Q 20/10 715/205 |
| 2010/0304783 A1* | 12/2010 | Logan | H04M 1/6066 704/235 |
| 2013/0030804 A1* | 1/2013 | Zavaliagkos | G10L 15/24 704/235 |
| 2015/0187355 A1* | 7/2015 | Parkinson | G06F 40/242 704/235 |
| 2015/0221306 A1* | 8/2015 | Zavaliagkos | G10L 15/065 704/235 |
| 2020/0168209 A1* | 5/2020 | Lannone | G10L 15/26 |
| 2022/0270595 A1* | 8/2022 | Kroehl | G10L 15/142 |
| 2022/0284254 A1* | 9/2022 | Sprague | G06K 19/07762 |

* cited by examiner

*Primary Examiner* — Daniel Abebe (57) ABSTRACT

Communication devices, such as headsets, point of sale terminals, and personal badges, are disclosed that include a microphone that receives and transmits audio content to a third party. The devices further include an automated speech recognition module, which is configured to receive the audio content and transcribe the audio content into text. In addition, the communication devices include a correlation module, which is configured to derive correlations between the audio content and a plurality of outputs—and transmit such correlations and outputs to the user of the communication device. The devices further include a user interface that displays a dynamic script checklist screen that is configured to communicate information in real-time to the person wearing or using the device, regarding a conversation that such person is having with a third party.

12 Claims, 6 Drawing Sheets

COMMUNICATION DEVICES WITH EMBEDDED AUDIO CONTENT TRANSCRIPTION AND ANALYSIS FUNCTIONS

CROSS-REFERENCE TO RELATED APPLICATIONS

This application claims priority to, and incorporates by reference, U.S. provisional patent application Ser. No. 63/115,799, filed on Nov. 19, 2020.

FIELD OF THE INVENTION

The field of the present invention relates to devices and methods for communicating and analyzing audio content and, more particularly, to devices that include (1) a microphone that receives audio content from a user; (2) an embedded automated speech recognition and transcription module; and (3) an embedded correlation module, which is configured to derive correlations between the audio content and a plurality of outputs—and which is further configured to transmit such correlations to an external computing device.

BACKGROUND OF THE INVENTION

Businesses and individuals would benefit from an improved ability to extract relevant information and data from conversations that, for example, employees have with existing customers, prospective customers, collaborators, and other third parties—and, in other contexts, from conversations among individuals who may be competing together in a video game environment. Similarly, the ability to extract relevant information and data from individuals who make statements or requests to another person, in the contexts mentioned above, would also be very useful. Such relevant information and data might include an improved ability to provide feedback or advice during the course of such conversations—and/or to enhance the playing experience of among video gamers. Such relevant information and data might also be used to connect individuals with sources of support, relevant products, and/or product providers. Although automated speech recognition (ASR) technology has been available for many years, such technology has not been effectively used in the context of various communication devices, such as within personal headsets or other wearable or nearby devices. In addition, in the context of such communication devices, such ASR technology has not been effectively paired with the ability to automatically derive correlations between audio content and various outputs, particularly in a manner that can be conveyed to both an external computing device and to a person operating the communication device in real-time (e.g., a person wearing a headset, a person equipped with other wearable or portable devices, or a person utilizing a point of sale device).

Accordingly, it would be advantageous to develop certain communication devices and methods that could be used to systematically, efficiently, and accurately transcribe and analyze such conversations and statements, extract relevant information and data from such conversations and statements (both at the individual and aggregate levels), derive correlations from such conversations and statements, and report such information, data, and correlations to one or more users of such devices.

As described further below, the present invention addresses many of these (and other) demands in the marketplace.

SUMMARY OF THE INVENTION

According to certain aspects of the present invention, communication devices are disclosed that include a microphone that is configured to receive and, optionally, transmit audio content and/or subsets of audio content to other third party communication devices and persons communicating with the user of the device (and, optionally, to an external computing device). Such devices may include personal headsets, point of sale terminals, personal badges, mobile phones, and other devices having the components and functionality described herein. The invention provides that such devices will preferably include an embedded automated speech recognition module (also referred to herein as a transcription module), which is configured to receive audio content spoken by a user of the device, transcribe the audio content into text, and, optionally, transmit the text in a digital format to an external computing device. In addition, the communication devices preferably include an embedded correlation module, which is configured to derive correlations between the audio content and a plurality of outputs—and transmit such correlations and outputs to a person wearing or using the communication device and, optionally, to an external computing device.

According to such aspects of the present invention, the correlation module is preferably configured to search for and detect words, phrases, or a combination of words and phrases contained within the content of the text. The invention provides that the correlation module is further configured, in certain embodiments, to derive correlations between such words, phrases, or combinations of words and phrases and certain known outputs (with the associations between words/phrases and known outputs being recorded within and accessible from a database that is included within or operably connected to the device). In additional embodiments, the invention provides that the correlation module is further configured to derive such correlations based on acoustic data associated with the audio content. The invention provides that the external computing device described herein may consist of a local computer, a remote server, and/or a cloud platform.

According to certain aspects of the invention, the communication devices, such as the headsets described herein, may be operably connected to a user interface that displays a dynamic script checklist screen that is configured to communicate information in real-time to the person wearing/using the device, regarding a conversation that such person is having with a third party. The invention provides that the dynamic script checklist screen may include one or more content segment titles, with each content segment title representing a different topic that the person wearing/using the device is prompted to discuss with the third party. The dynamic script checklist screen may further include expandable and collapsible script content windows associated with each of the one or more content segment titles, with each expandable and collapsible script content window displaying text that the person wearing/using the device is prompted to read and communicate to the third party through the microphone of the headset (or in proximity of the point of sale terminal or personal badge).

In addition, the dynamic script checklist screen may further include completion indicators located adjacent to each of the one or more content segment titles, with the communication device and user interface being configured to display a first type of completion indicator when the text associated with the expandable and collapsible script content window for a first content segment title has been read and communicated to the third party, and configured to display a second type of completion indicator when the text associated with the expandable and collapsible script content window for a second content segment title has not yet been read and communicated to the third party.

Still further, the communication devices of the invention may be further configured to transmit a data record to an external computing device. In such embodiments, the data record may include information identifying the person wearing the headset or personal badge (or operating the point of sale terminal), and a listing of the one or more content segment titles for which the text associated with the expandable and collapsible script content window for each such content segment was completely read and communicated to the third party. Such data records may then be studied and used, individually and in aggregated forms, for a variety of purposes and applications.

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Referring now to FIGS. 1-6, according to certain preferred embodiments of the present invention, communication devices 10 are provided that include a microphone 12 that is configured to receive and transmit audio content (in either analog or digital formats) to other third party communication devices, i.e., to other persons communicating with the user of the device 10, and, optionally, to an external computing device 14. In certain preferred embodiments, the invention provides that such devices 10 may include personal headsets 50 (FIG. 3), point of sale devices 52 (FIG. 5), or personal badges 54 (FIG. 6); whereas, in other embodiments, the devices 10 may consist of mobile phones and other devices 10 having the components and functionality described herein, including embedded microprocessors, microcontrollers, and digital memory facilities that are necessary to operate the transcription module 16 and correlation module 20 described further below.

Transcription Module

According to certain preferred embodiments, the invention provides that the devices 10 will preferably include an automated speech recognition module, also referred to herein as the transcription module 16, which is configured to receive audio content from the microphone 12, transcribe the audio content into text files 18, and, optionally, transmit the text files 18 in a digital format to an external computing device 14. The invention provides that the external computing device 14 may consist of a local computer, a remote server, and/or a cloud platform. In addition, in certain embodiments, the invention provides that the transcription module 16 is further configured to receive audio content from a third party source (e.g., from another person communicating with the user of the device 10 through, for example, a mobile phone or headset 50), transcribe such audio content into text files 18, and, optionally, transmit the text files 18 in a digital format to the external computing device 14. In certain preferred embodiments, the device 10 is preferably configured to transmit the text files 18—as transcribed from (1) audio content received by the microphone 12 and (2) audio content that the device 10 receives from a third party source—through separate and distinct channels, such that the corresponding streams of audio content can be bifurcated and separately monitored and analyzed. In addition, the invention provides that the device 10 may be configured to also transmit subsets of such text files 18 and/or audio content to the external computing device 14.

The invention provides that the transcription module 16 may be configured to transcribe audio content into the text files 18 described herein—and to transmit such text files 18, or subsets thereof, to an external computing device 14—at any of different points in time and/or according to different protocols. For example, the invention provides that the transcription module 16 may be configured to transcribe audio content into text files 18 and transmit the same or subsets thereof to an external computing device 14 in real-time (or near real-time) or, in other embodiments, intermittently in the form of batch transcriptions and file transfers. As used herein, the term "real-time" means that a specified action occurs immediately following another preceding action, e.g., when the specified action occurs within 1, 2, 3, 4, 5, 6, 7, 8, 16, or 32 seconds from the conclusion of a preceding action. For example, in the case of the speech-to-text transcriptions of audio content, the transcription module 16 can be said to execute speech-to-text transcriptions of such audio content in real-time, when the processing unit of the device 10 is operating at maximum speed (or near maximum speed) to execute such transcriptions. In the case of intermittent/batch transcriptions and file transfers to the external computing device 14, the invention provides that the transcription module 16 may be configured to execute such transcriptions and transmissions of text files 18 after a pre-defined number of words are detected within the audio content; after a pre-defined period of time has passed; after a pause in speech that exceeds a pre-defined number of seconds is detected within the audio content; after the end of each sentence of the audio content; following the end of a conversation; when changes occur in the person speaking who is generating the audio content; and/or combinations of the foregoing protocols.

Correlation Module

Figure 1:
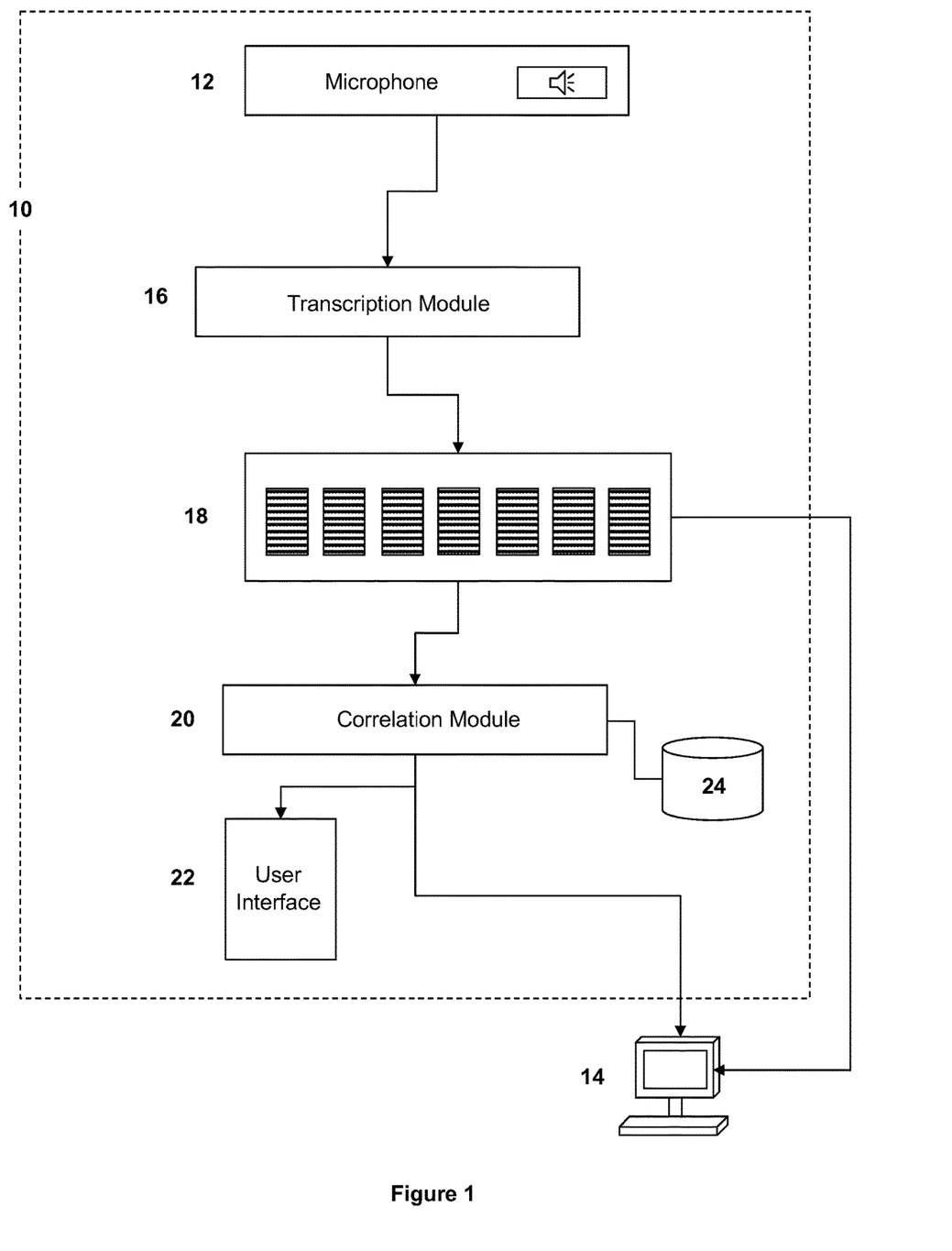
FIG. 1 is a diagram that illustrates certain components of the devices described herein, including the microphone, transcription module, correlation module, and internal database described herein.
Figure 2:
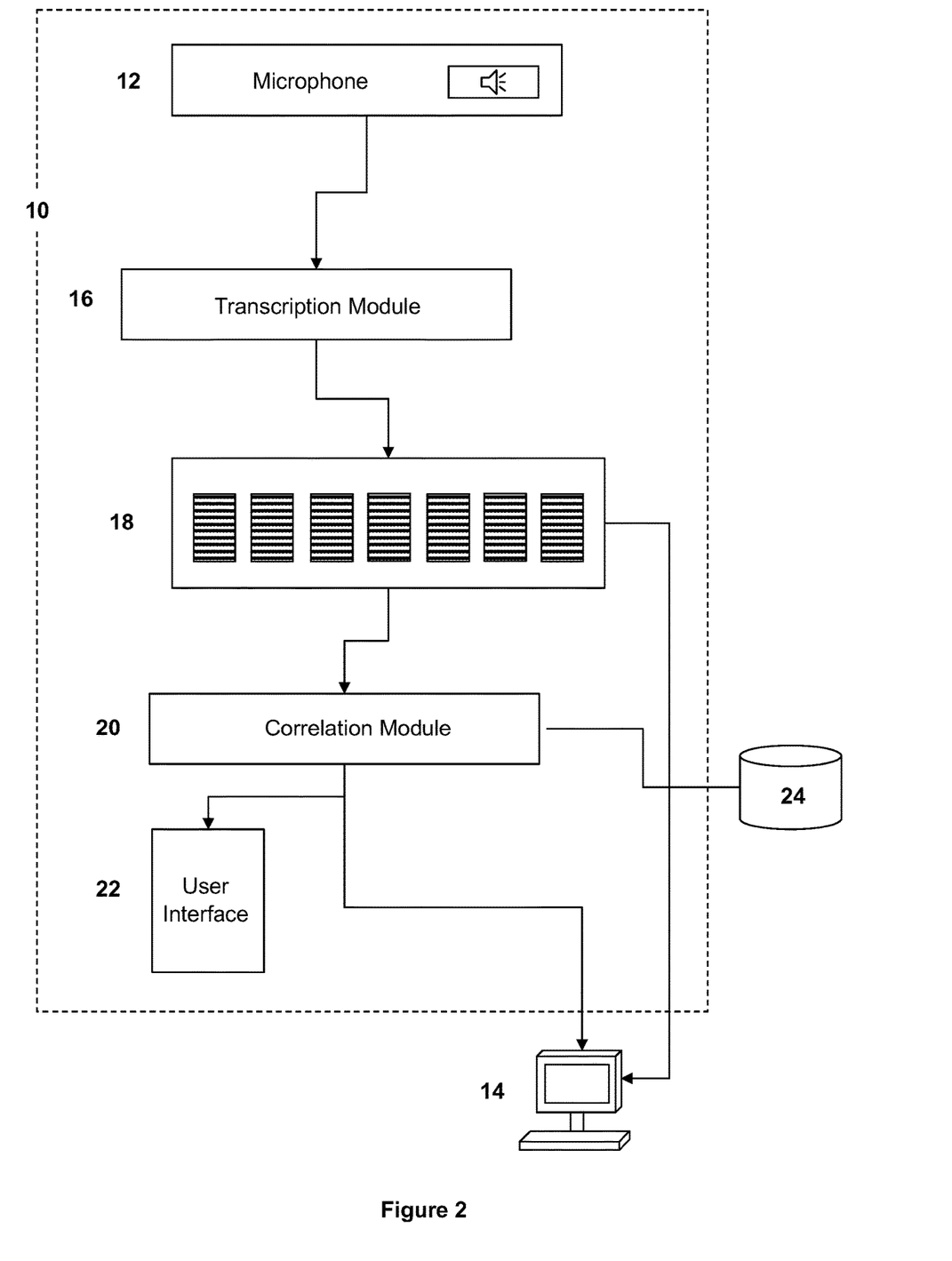
FIG. 2 is a diagram that illustrates the components of the devices described herein and shown in FIG. 1, but which utilize an external database with the correlation module described herein.

According to certain preferred embodiments of the present invention, the communication devices 10 preferably include a correlation module 20, which is configured to derive correlations between the audio content (and text files 18 transcribed therefrom) and a plurality of outputs as described further below—and transmit such correlations to the user of the device 10 and, optionally, to the external computing device 14. The devices 10 of the present invention further include (or are operably connected to) at least one database 24 in communication with the correlation module 20, with such database 24 being configured to receive, record, and make accessible certain correlative data for use by the correlation module 20 (and for recording, searching, and reviewing the correlations and outputs generated by the correlation module 20). The invention provides that such database 24 may be housed within the device 10 itself (FIG. 1) or, in other embodiments, the database 24 may be housed outside of, while being wirelessly and operably connected to, the device 10 (FIG. 2). The invention provides that the database 24 is configured to be updated and modified to include new and/or modified correlations between certain words/phrases and particular outputs.

According to such embodiments of the present invention, the correlation module 20 is preferably configured to search for and detect words, phrases, or a combination of words and phrases contained within the content of the text files 18 transcribed from audio content. The invention provides that such detected words, phrases, or combination of words and phrases will be correlated with certain pre-defined outputs that are recorded within the database 24, e.g., a correlation may exist between the presence of a key word detected in a text file 18 spoken by a sales representative and a product sale (which is the known output in that example). More particularly, the invention provides that the correlation module 20 is preferably configured to derive correlations—and the additional outputs mentioned herein—between the text files 18 and pre-defined outputs recorded within the database 24 by detecting, for example, words that are present in the text files 18 a specified minimum number of times, word combinations that are present in the text files 18, a word in a defined relationship with another word in the text files 18, semantic content, or combinations or variations of the foregoing.

Still more particularly, in some embodiments, the invention provides that the correlation module 20 may derive correlations between the text files 18 and pre-defined outputs recorded within the database 24 using, in part, a set of keywords—e.g., words that are detected in the text files 18 a specified minimum number of times (i.e., words that meet a specified threshold of usage). In such embodiments, the invention provides that a user of the devices 10 described herein may modulate the specified threshold, as recorded within the database 24. In addition, the invention provides that keywords may consist of multiple variables, e.g., rules may be created whereby a word must be detected in a defined proximity to other specified words in order for that collection of words (or phrase) to be considered detected in a text file 18. In certain embodiments, the invention provides that such analyses, and correlation steps performed by the correlation module 20, may analyze the occurrence of certain words, and the relationships between different words, to determine if certain audio content is present—and/or to ascertain the intent, desires, and/or needs of the person speaking such words.

In addition to frequency of keyword usage, the invention provides that other forms of "machine learning" may be employed to identify correlations between the text files 18 and known outputs. The invention provides that the correlation module 20 may be configured to utilize any of various known algorithms to derive correlations between the text files 18 and known outputs. Non-limiting examples of algorithms that may be used in such embodiments include, but are not limited to, algorithms commonly known as transformers (such as T5 or GPT), C4.5, k-means, SVM (support vector machines), Apriori, EM (expectation-maximization), AdaBoost, kNN (k-Nearest Neighbors), Naive Bayes, CART (classification and regression trees), and/or derivatives of any of the foregoing algorithms.

In additional embodiments, the invention provides that the correlation module 20 is further configured to derive such correlations based on acoustic data associated with the audio content. For example, the device 10 and correlation module 20 may optionally be configured to detect and derive correlations between audio content and known outputs, which are associated with various human emotions, such as anger, fear, joy, sadness, and neutral emotions. Such correlation techniques are described in U.S. Pat. No. 10,002,192, which is hereby incorporated by reference.

Figure 3:
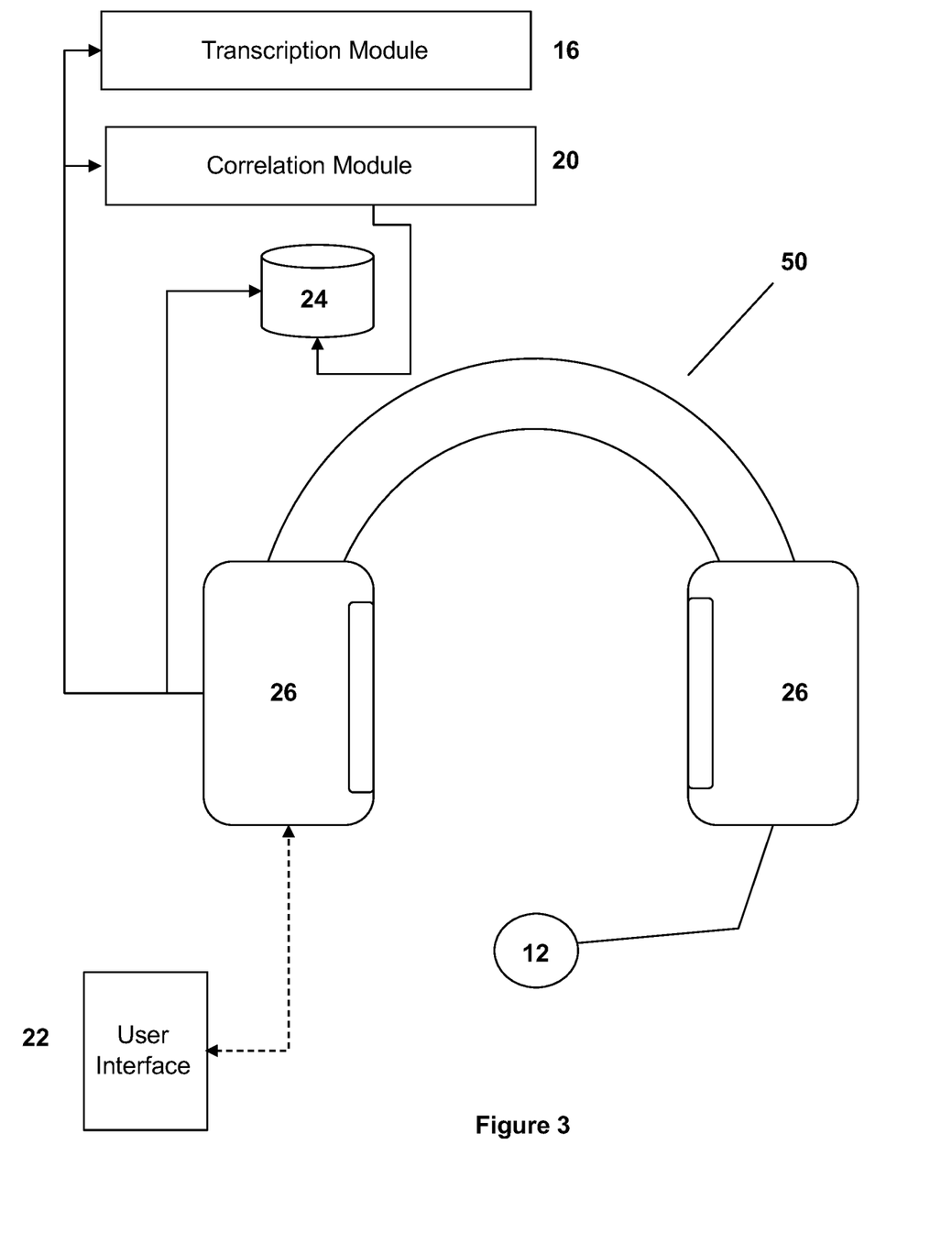
FIG. 3 is a diagram of a personal headset of the present invention, which includes the components and functionality described herein.
Figure 5:
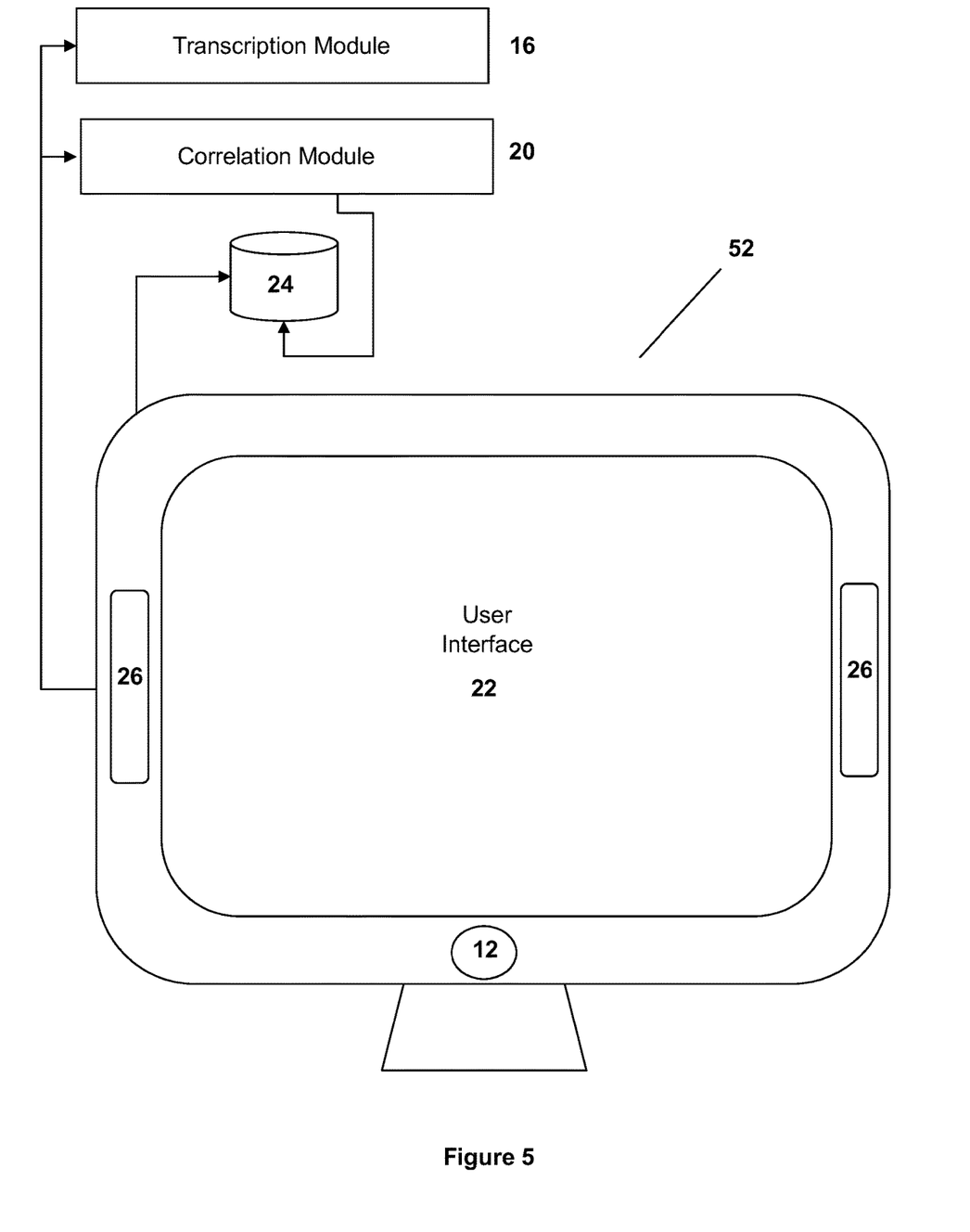
FIG. 5 is a diagram of a point of sale device of the present invention, which includes the components and functionality described herein.
Figure 6:
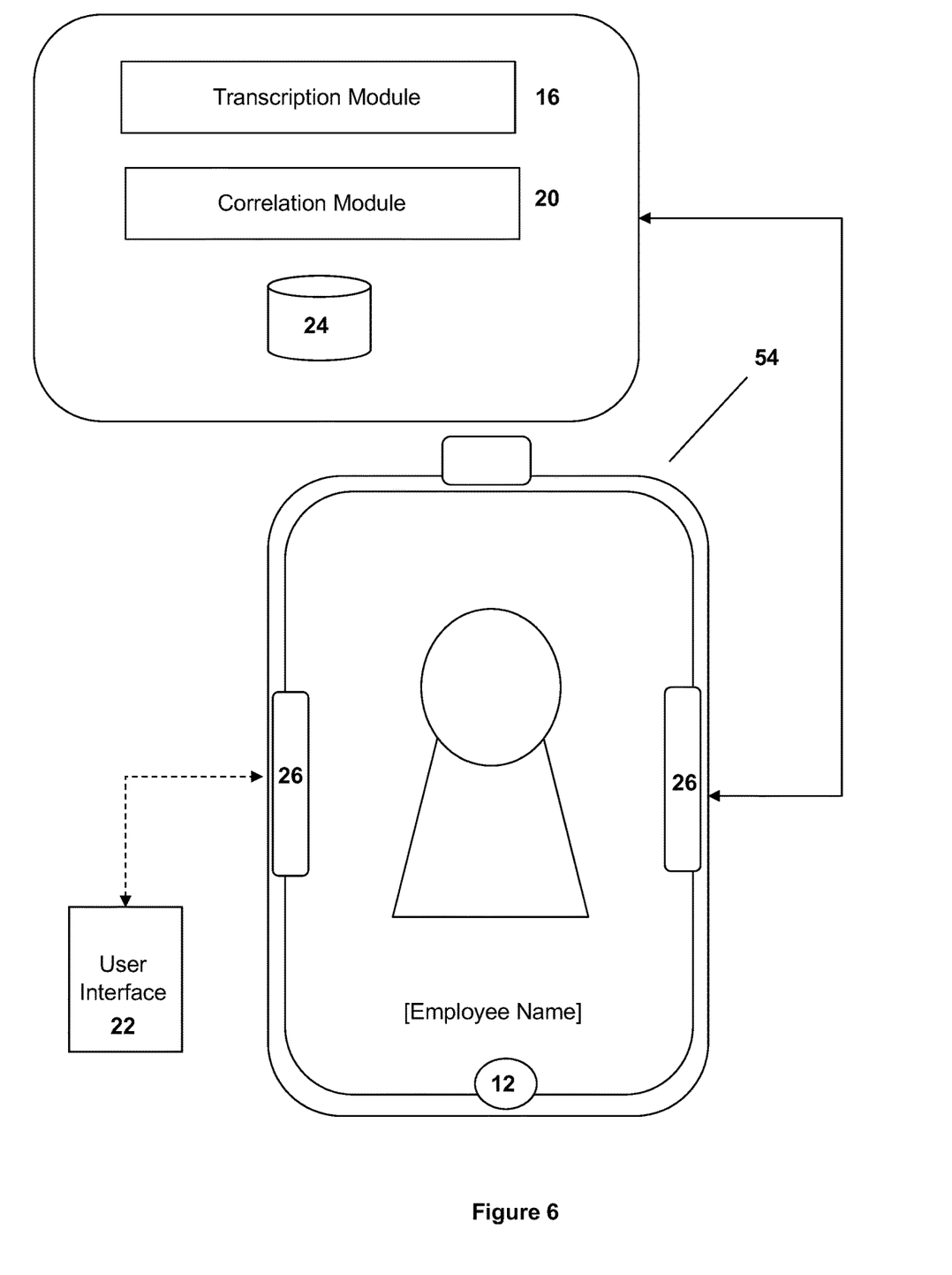
FIG. 6 is a diagram of a personal badge device of the present invention, which includes the components and functionality described herein.

The invention provides that the device 10 may be further configured to communicate such correlations to a person operating the device 10, such as a person wearing a headset 50 of the present invention described herein. Such communication may be achieved through a user interface 22 associated with the device 10, e.g., through a visual interface operably connected to the headset 50, point of sale device 52, or personal badge 54. In other embodiments, the correlations may be audibly communicated to a user of the device 10, such as through the speakers 26 associated with the headset 50, point of sale device 52, or personal badge 54 described herein.

Referring to FIG. 3, as mentioned above, the invention provides that the device 10 may consist of a personal headset 50. In such embodiments, the headset 50 will include one or more standard earpieces/speakers 26, which may optionally be connected through an adjustable headband that connects the earpieces/speakers 26. The headset 50 will preferably comprise its own microphone 12, as described herein. The headset 50 will also preferably be configured to wirelessly communicate audio content in a digital or analog format to third party phones, computer devices, and other devices—e.g., to other persons communicating with the person wearing the headset 50 of the present invention through standard telephony, Internet communication channels, and/or VoIP applications. As explained above, in these embodiments, the headset 50 will preferably include an embedded transcription module 16 and correlation module 20, along with an internal or external database 24 operably connected to the correlation module 20.

Referring to FIG. 5, as mentioned above, the invention provides that the device 10 may also consist of a point of sale device/terminal 52. In such embodiments, the point of sale device/terminal 52 will include one or more speakers 26. In addition, the point of sale device/terminal 52 will preferably comprise its own microphone 12, as described herein. The point of sale device/terminal 52 will also preferably be configured to wirelessly communicate audio content in a digital or analog format to third party phones, computer devices, and other devices—e.g., to other persons communicating with the person operating the point of sale device/terminal 52 of the present invention through standard telephony, Internet communication channels, and/or VoIP applications. As explained above, in these embodiments, the point of sale device/terminal 52 will preferably include an embedded transcription module 16 and correlation module 20, along with an internal or external database 24 operably connected to the correlation module 20.

Still further, referring now to FIG. 6, the invention provides that the device 10 may also consist of a personal badge 54, to be worn by the person operating the personal badge 54. As with the other embodiments described herein, the personal badge 54 may include one or more speakers 26. In addition, the personal badge 54 will preferably comprise its own microphone 12, as described herein. The personal badge 54 will also preferably be configured to wirelessly communicate audio content in a digital or analog format to third party phones, computer devices, and other devices—e.g., to other persons communicating with the person operating the personal badge 54 of the present invention through standard telephony, Internet communication channels, and/or VoIP applications. As explained above, in these embodiments, the personal badge 54 may include an embedded transcription module 16 and correlation module 20. In other embodiments, the transcription module 16 and correlation module 20 may exist within a separate computing device in close proximity to and in communication with the personal badge 54. Still further, in such embodiments, the personal badge 54 will include an internal or, more likely, external database 24 operably connected to the correlation module 20.

Device Application Example-1

The invention provides that numerous applications exist for the devices 10 described herein. For example, the devices 10 will have useful applications in video gaming, such as monitoring sales opportunities by Internet service providers (e.g., when a gamer exclaims that his/her "Internet is too slow," the service provider may be alerted by the external computing device 14); detecting churn risk and product dissatisfaction by gamers; detecting interest expressed by users in competing games and gaming platforms; monitoring for bullying and hate speech from gamers; enabling user voice commands to the video game console; detecting user sentiments, frustrations, and boredom associated with a particular product, to enable dynamic adjustments to the applicable gaming environment; and many others—all of which are non-limiting examples of known outputs that may be correlated with certain words/phrases within speech/audio content. In addition, the devices 10 will have useful applications in on-line education environments, such as monitoring activity among students; monitoring for bullying and hate speech among students; detecting and monitoring responses to student questions; and many others.

Device Application Example-2

Still further, the devices 10 will have useful applications for business call centers and point of sale transactions, particularly the headsets 50 (FIG. 3), point of sale terminals 52 (FIG. 5), and personal badges 54 (FIG. 6) described herein. For example, a headset 50, point of sale terminal 52, or personal badge 54 that captures and transcribes conversations between business personnel and customers; a headset 50, point of sale terminal 52, or personal badge 54 that detects events, such as a conversation moving closer to a sale, such that others within the business can be timely alerted through electronic communications; a headset 50, point of sale terminal 52, or personal badge 54 that provides users with performance feedback, technical hints, sales suggestions, script reminders, and the like; a headset 50, point of sale terminal 52, or personal badge 54 that is configured to transmit the text files 18 and correlations described herein to the external computing device 14, which is configured to send back to the user certain advice, coaching, and/or other reference material; a headset 50, point of sale terminal 52, or personal badge 54 that is configured to detect correlations within audio content that are known to be associated with security risks, fraud attempts, and other dangerous events; a headset 50, point of sale terminal 52, or personal badge 54 that continuously detects and collects information pertaining to mentions of brand names (which could be useful for market research); a headset 50, point of sale terminal 52, or personal badge 54 that is configured to monitor script compliance among sales personnel; a headset 50, point of sale terminal 52, or personal badge 54 that configured to detect customer complaints embodied in audio content; a headset 50, point of sale terminal 52, or personal badge 54 that is configured to monitor work and non-work related conversations among employees; and many others.

With respect to such devices 10 (e.g., the headset 50, point of sale terminal 52, or personal badge 54 described herein) having useful applications for business call centers and point of sale transactions, the device 10 and its user interface 22—which may be a separate screen or computer monitor that is operably connected to the device 10—may be configured to provide users with performance feedback, technical hints, sales suggestions, script reminders, and the like. More particularly, and referring now to FIG. 4, the device 10 and its user interface 22 may be configured to provide such performance feedback and guidance in real-time, through a dynamic script checklist screen 28 (DSCS). For example, the DSCS 28 presented within the user interface 22 may be configured to list a customer name 30, a clock 32 indicating the call duration in real-time, content segments 34 of a customer discussion that a sales person is expected to complete (i.e., with each content segment 34 representing a different topic that a sales person should cover with a customer), expandable and collapsible script content 36, and completion indicators 38.

Figure 4:
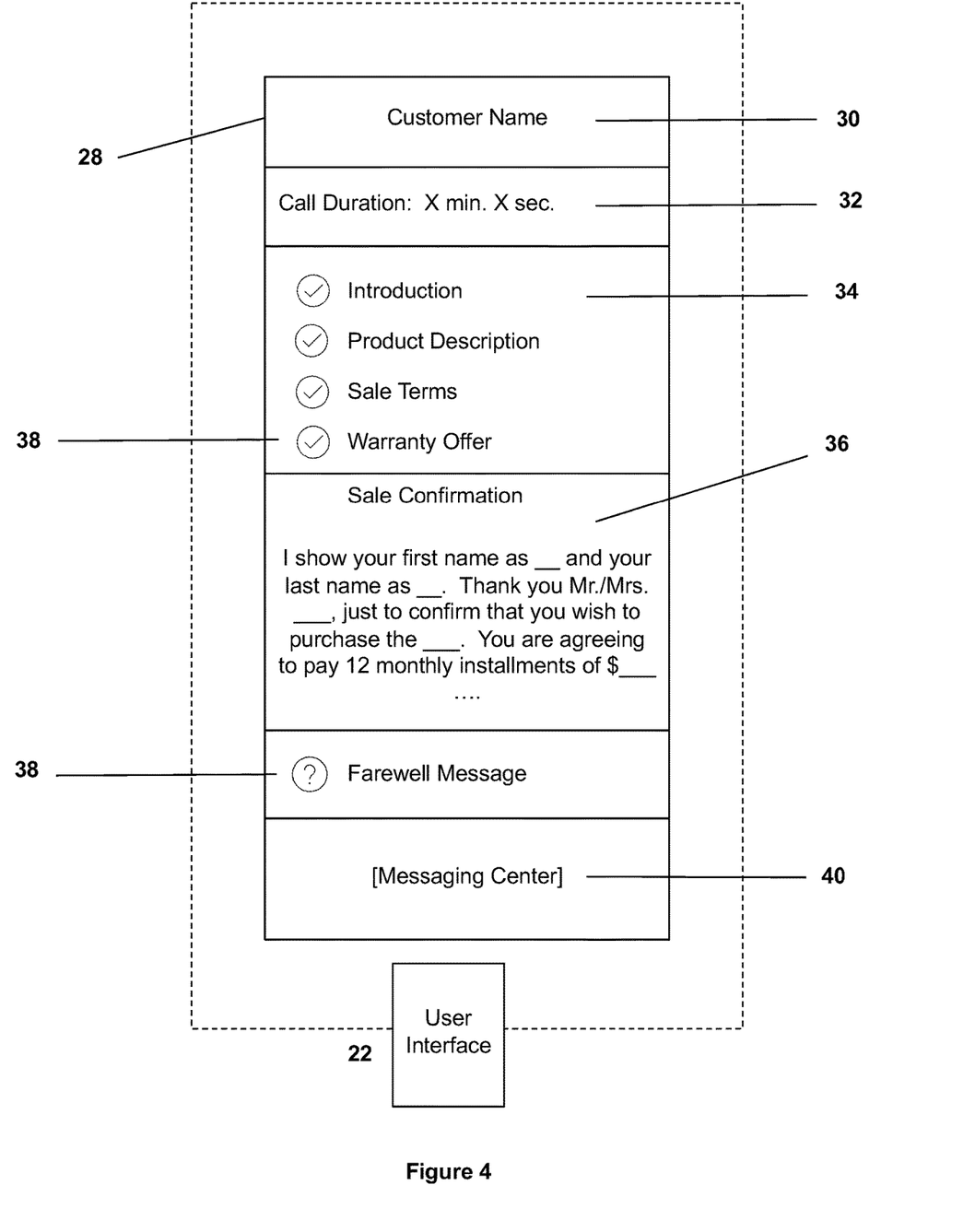
FIG. 4 is a diagram of an example dynamic script checklist screen described herein.

In such embodiments, the embedded transcription module 16 is configured to transcribe the sale person's spoken content into text (as described above)—and the correlation module 20 is configured to then compare such text files to an internal or external database 24 operably connected to the correlation module 20 to compute whether the sales person has recited (or has substantially recited) the content included within each of the content segments 34 (e.g., an introduction, product description, sales terms, etc.). For those content segments 34 that the correlation module 20 computes to have been spoken by the sales person, the device 10 issues an instruction to the user interface 22 to display within the DSCS 28 that a content segment 34 has been completed, e.g., by displaying a completion indicator 38, e.g., in the form of a check mark adjacent to the title of each content segment 34, while other yet-to-be-completed content segments 34 may be denoted with a different completion indicator 38, e.g., such as in the form of a question mark. In such embodiments, once the correlation module 20 computes that a content segment 34 has been completed, the collapsible script content 36 for that content segment 34 will automatically collapse and will no longer be viewable, and the subsequent collapsible script content 36 will automatically open and become viewable for the next content segment 34 for the sales person to cover. Importantly, in such embodiments, the DSCS 28 not only serves as an interactive and dynamic checklist for the sales person to follow, it also serves as a type of teleprompter for the sales person by providing the expandable and collapsible script content 36.

In such embodiments, the invention further provides that, upon completion of a call with a customer, the device 10 may be configured to transmit to the external computing device 14 a data record pertaining to the call. For example, the device 10 may be configured to transmit to the external computing device 14 the sales person's name, the customer name 30, the duration of the call, a listing of which content segments 34 were completed, a listing of which content segments 34 were not completed, and, optionally, notes that the sales person wishes to associate with the data record. Such notes that the sales person wishes to associate with the data record may be verbally spoken into the microphone 12 of the device 10, converted into a text file by the transcription module 16, and then associated with the applicable data record. The invention provides that such data records may then be studied individually and in the aggregate for a number of reasons. For example, such data records may be studied to measure the performance of individual sales people. In addition, the data records may be studied to measure the effectiveness of particular content segments 34 and script content 36, e.g., to ascertain which content segments 34 and corresponding script content 36 are most likely to lead to a sale, such that adjustments can be made over time to optimize such content segments 34 and script content 36 for a particular purpose.

According to yet further embodiments, the correlation module 20 may be configured to detect the presence of certain key words that are correlated to negative outcomes or content that a sales person is prohibited from speaking. For example, if a business does not offer any product warranty, and if the correlation module 20 detects that a sales person has offered a product warranty to a customer, the correlation module 20 will be configured to immediately issue an instruction to the DSCS 28 to publish a corrective statement, e.g., a statement that instructs the sales person to retract his/her offer of a product warranty. The publication of such corrective statements and other communications may be located within a dedicated messaging center 40 of the DSCS 28.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A headset device configured to be worn and operated by a person, which comprises:
    (a) one or more speakers;
    (b) a microphone that is configured to receive and transmit audio content to a third party communication device;
    (c) an embedded transcription module, which is configured to receive the audio content from the microphone and transcribe the audio content into a text file; and
    (d) an embedded correlation module, which is configured to (i) derive correlations between the audio content and one or more outputs, (ii) derive correlations based on acoustic data associated with human emotions, and (iii) communicate such outputs within an external computing device and/or to a person wearing the headset device, wherein the headset device is further configured to transmit a data record to the external computing device, wherein the data record includes (i) information identifying the person wearing the headset device; and (ii) a listing of one or more content segment titles for which text associated with each such content segment was completely read and communicated to the third party.

2. The headset device of claim 1, wherein the headset device is further configured to transmit the text file in a digital format to the external computing device.

3. The headset device of claim 1, wherein the correlation module is configured to search for and detect words, phrases, or a combination of words and phrases contained within the text file.

4. The headset device of claim 1, which is operably connected to a user interface that displays a dynamic script checklist screen that is configured to communicate information in real-time to the person wearing the headset device regarding a conversation that such person is having with a third party.

5. The headset device of claim 4, wherein the dynamic script checklist screen includes:
    (a) the one or more content segment titles, with each content segment title representing a different topic that the person wearing the headset device is prompted to discuss with the third party; and
    (b) expandable and collapsible script content windows associated with each of the one or more content segment titles, wherein each expandable and collapsible script content window displays text that the person wearing the headset device is prompted to read and communicate to the third party.

6. The headset device of claim 5, wherein the dynamic script checklist screen further includes completion indicators located adjacent to each of the one or more content segment titles, wherein (a) the headset device and dynamic script checklist screen are configured to display a first type of completion indicator when the text associated with the expandable and collapsible script content window for a first content segment title has been read and communicated to the third party and (b) the headset device and dynamic script checklist screen are configured to display a second type of completion indicator when the text associated with the expandable and collapsible script content window for a second content segment title has not been read and communicated to the third party.

7. A point of sale terminal, which comprises:
    (a) a microphone that is configured to receive and transmit audio content to an external computing device;
    (b) a transcription module, which is configured to receive the audio content from the microphone and transcribe the audio content into a text file; and
    (c) a correlation module, which is configured to (i) derive correlations between the audio content and one or more outputs, (ii) derive correlations based on acoustic data associated with human emotions, and (iii) communicate such outputs within the external computing device and/or to a person operating the point of sale terminal, wherein the point of sale terminal is further configured to transmit a data record to the external computing device, wherein the data record includes (i) information identifying the person operating the point of sale terminal; and (ii) a listing of one or more content segment titles for which text associated with each such content segment was completely read and communicated to a third party.

8. The point of sale terminal of claim 7, which further comprises a user interface that is configured to display a dynamic script checklist screen that is configured to communicate information in real-time to the person operating the point of sale terminal regarding a conversation that such person is having with the third party, wherein the dynamic script checklist screen includes:
  (i) the one or more content segment titles, with each content segment title representing a different topic that the person operating the point of sale terminal is prompted to discuss with the third party; and
  (ii) expandable and collapsible script content windows associated with each of the one or more content segment titles, wherein each expandable and collapsible script content window displays text that the person operating the point of sale terminal is prompted to read and communicate to the third party.

9. The point of sale terminal of claim 8, wherein the dynamic script checklist screen further includes completion indicators located adjacent to each of the one or more content segment titles, wherein (a) the dynamic script checklist screen is configured to display a first type of completion indicator when the text associated with the expandable and collapsible script content window for a first content segment title has been read and communicated to the third party and (b) the dynamic script checklist screen is configured to display a second type of completion indicator when the text associated with the expandable and collapsible script content window for a second content segment title has not been read and communicated to the third party.

10. A personal badge, which comprises:
  (a) a microphone that is configured to receive and transmit audio content to an external computing device;
  (b) a transcription module, which is configured to receive the audio content from the microphone and transcribe the audio content into a text file; and
  (c) a correlation module, which is configured to (i) derive correlations between the audio content and one or more outputs, (ii) derive correlations based on acoustic data associated with human emotions, and (iii) communicate such outputs within the external computing device and/or to a person wearing the personal badge, wherein the personal badge is further configured to transmit a data record to the external computing device, wherein the data record includes (i) information identifying the person wearing the personal badge; and (ii) a listing of one or more content segment titles for which text associated with each such content segment was completely read and communicated to a third party.

11. The personal badge of claim 10, wherein the personal badge is further configured to transmit (a) the text file in a digital format to the external computing device; (b) the correlations and outputs to the external computing device; or (c) both (a) and (b).

12. The personal badge of claim 10, wherein the correlation module is configured to search for and detect words, phrases, or a combination of words and phrases contained within the text file.

\* \* \* \* \*